(12) United States Patent
Tsai et al.

(10) Patent No.: US 9,223,886 B1
(45) Date of Patent: Dec. 29, 2015

(54) SYSTEM, DEVICE, AND METHOD FOR REDUCING PILOT INTERACTION BETWEEN PAGES SHOWN ON A DISPLAY UNIT

(75) Inventors: Hung-i B. Tsai, Cedar Rapids, IA (US); Raymond P. Roland, Oakville (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 806 days.

(21) Appl. No.: 12/893,212

(22) Filed: Sep. 29, 2010

(51) Int. Cl.
*G06F 3/048* (2013.01)
*G06F 17/30* (2006.01)
*G06F 3/0481* (2013.01)

(52) U.S. Cl.
CPC ........ *G06F 17/30884* (2013.01); *G06F 3/0481* (2013.01)

(58) Field of Classification Search
CPC ............................. G06F 3/0484; G06F 3/0481
USPC .......... 715/771, 810, 822, 840, 859, 860, 772
See application file for complete search history.

(56) References Cited

U.S. PATENT DOCUMENTS

| | | | | |
|---|---|---|---|---|
| 2003/0135820 A1* | 7/2003 | Aasman | ......................... | 715/500 |
| 2004/0183695 A1* | 9/2004 | Ruokangas et al. | .......... | 340/945 |
| 2006/0195235 A1* | 8/2006 | Ishihara et al. | ................. | 701/16 |
| 2007/0035523 A1* | 2/2007 | Cohen | ........................... | 345/169 |
| 2008/0187248 A1* | 8/2008 | Ikeda et al. | ................... | 382/305 |
| 2010/0121660 A1* | 5/2010 | Boykin | ............................ | 705/5 |
| 2011/0248854 A1* | 10/2011 | Tramper et al. | ............... | 340/600 |

OTHER PUBLICATIONS

U.S. Appl. No. 12/562,252, filed Sep. 18, 2009, Inventor: Tsai.

* cited by examiner

*Primary Examiner* — Ajay Bhatia
*Assistant Examiner* — Phuong Nguyen
(74) *Attorney, Agent, or Firm* — Angel N. Gerdzhikov; Donna P. Suchy; Daniel M. Barbieri (57) ABSTRACT

A present novel and non-trivial system, device, and method for reducing pilot interaction between pages presented on the screen of a display unit are disclosed. The system comprises a source for providing pilot input data, a window generator ("WG"), processor, and a display unit; the system could also comprise an aural alert unit. Data received from the pilot input source includes data responsive to a pilot's interaction with one or more graphical user interfaces ("GUIs"). After receiving the input data, the WG generates window image data representative of a window, one or more menus, a front page integrated with at least front page GUI, and one or more window GUIs. Then, the display unit receives the window image data and presents the information on the display unit. Additionally, the WG generates aural alert data. An aural alert unit receives the aural alert data and aurally presents the alert.

18 Claims, 7 Drawing Sheets

| LEG | CRS / DIST | ALT | SPEED KTAS | GS | WINDS | FUEL | TIME LEG | TOTAL |
|---|---|---|---|---|---|---|---|---|
| KSFO | | | | | | | | |
| WAGES | 129° / 49 | ↑ | 313 | 311 | 215° @ 5 | 376 | 0:10 | 0:10 |
| AVE | 123° / 117 | FL310 | 428 | 422 | 219° @ 44 | 821 | 0:16 | 0:27 |
| DERBB | 139° / 29 | FL310 | 429 | 410 | 219° @ 49 | 933 | 0:04 | 0:31 |
| REYES | 139° / 44 | FL310 | 429 | 411 | 219° @ 49 | 1,104 | 0:06 | 0:37 |
| PIRUE | 139° / 12 | FL310 | 429 | 411 | 219° @ 49 | 1,150 | 0:01 | 0:39 |
| FIM | 141° / 10 | ↓ | 349 | 332 | 219° @ 46 | 1,173 | 0:01 | 0:41 |
| PAULA | 165° / 5 | ↓ | 362 | 341 | 217° @ 24 | 1,182 | <0:01 | 0:42 |
| ILEAN | 160° / 4 | ↓ | 334 | 327 | 212° @ 7 | 1,189 | <0:01 | 0:42 |
| WAKER | 164° / 11 | ↓ | 308 | 281 | 206° @ 20 | 1,212 | 0:02 | 0:45 |
| KLAX | 96° / 22 | ↓ | 265 | 263 | CALM | 1,262 | 0:05 | 0:50 |

FIG. 2E

| LEG | CRS / DIST | ALT | SPEED KTAS | GS | WINDS | FUEL | TIME LEG | TOTAL |
|---|---|---|---|---|---|---|---|---|
| KSFO | | | | | | | | |
| WAGES | 129° / 49 | ↑ | 313 | 311 | 215° @ 5 | 376 | 0:10 | 0:10 |
| AVE | 123° / 117 | FL310 | 428 | 422 | 219° @ 44 | 821 | 0:16 | 0:27 |
| DERBB | 139° / 29 | FL310 | 429 | 410 | 219° @ 49 | 933 | 0:04 | 0:31 |
| REYES | 139° / 44 | FL310 | 429 | 411 | 219° @ 49 | 1,104 | 0:06 | 0:37 |
| PIRUE | 139° / 12 | FL310 | 429 | 411 | 219° @ 49 | 1,150 | 0:01 | 0:39 |
| FIM | 141° / 10 | ↓ | 349 | 332 | 219° @ 46 | 1,173 | 0:01 | 0:41 |
| PAULA | 165° / 5 | ↓ | 362 | 341 | 217° @ 24 | 1,182 | <0:01 | 0:42 |
| ILEAN | 160° / 4 | ↓ | 334 | 327 | 212° @ 7 | 1,189 | <0:01 | 0:42 |
| WAKER | 164° / 11 | ↓ | 308 | 281 | 206° @ 20 | 1,212 | 0:02 | 0:45 |
| KLAX | 96° / 22 | ↓ | 265 | 263 | CALM | 1,262 | 0:05 | 0:50 |

FIG. 2F

| ROUTE ▽ | | | FMS1 | | | | | |
|---|---|---|---|---|---|---|---|---|
| | | | | SPEED | | | | TIME |
| LEG | CRS / DIST | ALT | KTAS | GS | WINDS | FUEL | LEG | TOTAL |
| KSFO | | | | | | | | |
| WAGES | 129° / 49 | ↑ | 313 | 311 | 215° @ 5 | 376 | 0:10 | 0:10 |
| AVE | 123° / 117 | FL310 | 428 | 422 | 219° @ 44 | 821 | 0:16 | 0:27 |
| DERBB | 139° / 29 | FL310 | 429 | 410 | 219° SET ALERT: -:-- | | | 0:31 |
| REYES | 139° / 44 | FL310 | 429 | 411 | 219° @ 49 | 1,104 | 0:06 | 0:37 |
| PIRUE | 139° / 12 | FL310 | 429 | 411 | 219° @ 49 | 1,150 | 0:01 | 0:39 |
| FIM | 141° / 10 | ↓ | 349 | 332 | 219° @ 46 | 1,173 | 0:01 | 0:41 |
| PAULA | 165° / 5 | ↓ | 362 | 341 | 217° @ 24 | 1,182 | <0:01 | 0:42 |
| ILEAN | 160° / 4 | ↓ | 334 | 327 | 212° @ 7 | 1,189 | <0:01 | 0:42 |
| WAKER | 164° / 11 | ↓ | 308 | 281 | 206° @ 20 | 1,212 | 0:02 | 0:45 |
| KLAX | 96° / 22 | ↓ | 265 | 263 | CALM | 1,262 | 0:05 | 0:50 |

FIG. 2G

| ROUTE ▽ | | | FMS1 | | | | | |
|---|---|---|---|---|---|---|---|---|
| | | | | SPEED | | | | TIME |
| LEG | CRS / DIST | ALT | KTAS | GS | WINDS | FUEL | LEG | TOTAL |
| KSFO | | | | | | | | |
| WAGES | 129° / 49 | ↑ | 313 | 311 | 215° @ 5 | 376 | 0:10 | 0:10 |
| AVE | 123° / 117 | FL310 | 428 | 422 | 219° @ 44 | 821 | 0:16 | 0:27 |
| DERBB | 139° / 29 | FL310 | 429 | 410 | 219° @ 49 | 933 | 0:04 | 0:31 |
| REYES | 139° / 44 | FL310 | 429 | 411 | 219° @ 49 | 1,104 | 0:06 | 0:37 |
| PIRUE | 139° / 12 | FL310 | 429 | 411 | 219° @ 49 | 1,150 | 0:01 | 0:39 |
| FIM | 141° / 10 | ↓ | 349 | 332 | 219° @ 46 | 1,173 | 0:01 | 0:41 |
| PAULA | 165° / 5 | ↓ | 362 | 341 | 217° @ 24 | 1,182 | <0:01 | 0:42 |
| ILEAN | 160° / 4 | ↓ | 334 | 327 | 212° @ 7 | 1,189 | <0:01 | 0:42 |
| WAKER | 164° / 11 | ↓ | 308 | 281 | 206° @ 20 | 1,212 | 0:02 | 0:45 |
| KLAX | 96° / 22 | ↓ | 265 | 263 | CALM | 1,262 | 0:05 | 0:50 |

FIG. 2H

| ROUTE ▽ | | | FMS1 | | | | | |
|---|---|---|---|---|---|---|---|---|
| | | | SPEED | | | | TIME | |
| LEG | CRS / DIST | ALT | KTAS | GS | WINDS | FUEL | LEG | TOTAL |
| KSFO | | | | | | | | |
| WAGES | 129° / 49 | ↑ | 313 | 311 | 215° @ 5 | 376 | 0:10 | 0:10 |
| AVE | 123° / 117 | FL310 | 428 | 422 | 219° @ 44 | 821 | 0:16 | 0:27 |
| DERBB | 139° / 29 | FL310 | 429 | 410 | 219° @ 49 | 933 | 0:04 | 0:31 |
| REYES | 139° / 44 | FL310 | 429 | 411 | 219° @ 49 | 1,104 | 0:06 | 0:37 |
| PIRUE | 139° / 12 | FL310 | 429 | 411 | 219° @ 49 | 1,150 | 0:01 | 0:39 |
| FIM | 141° / 10 | ↓ | 349 | 332 | 219° @ 46 | 1,173 | 0:01 | 0:41 |
| PAULA | 165° / 5 | ↓ | 362 | 341 | 217° @ 24 | 1,182 | <0:01 | 0:42 |
| ILEAN | 160° / 4 | ↓ | 334 | 327 | 212° @ 7 | 1,189 | <0:01 | 0:42 |
| WAKER | 164° / 11 | ↓ | 308 | 281 | 206° @ 20 | 1,212 | 0:02 | 0:45 |
| KLAX | 96° / 22 | ↓ | 265 | 263 | CALM | 1,262 | 0:05 | 0:50 |

FIG. 2I

| FUEL MGMT ▽ | | FMS1 | |
|---|---|---|---|
| RESERVE | 1,200 LB | FUEL QTY | 3,000 LB |
| TAXI FUEL | 400 LB | CALC FMS FOB | 3,000 LB |
| FF CORRECTION | 0.0 % | | |
| GRD SPEED | 0 KTS | FUEL FLOW | 0 PPH |
| RNG TO RESERVE | 0 KTS | SPEC RNG GS | 0 NM/LB |
| TIME TO RESERVE | 0:00 | SPEC RNG TAS | 0 NM/LB |

SYSTEM, DEVICE, AND METHOD FOR REDUCING PILOT INTERACTION BETWEEN PAGES SHOWN ON A DISPLAY UNIT

BACKGROUND OF THE INVENTION

1. Field of the Invention

This invention pertains generally to the field of display units that provide flight plan information to the pilot or flight crew of an aircraft.

2. Description of the Related Art

Pilots interact with flight systems; for example, one such flight system is a flight management system ("FMS"). Electronic display units have facilitated user interaction between the pilot and the FMS, and the introduction of window-based formats has allowed the pilot to view graphically-depicted windows on the screen. Through the use of a menu and/or a graphical user interface ("GUI"), the pilot may select a page from a plurality of pages.

The FMS is known to perform a variety of functions to help the crew in the management of the flight. These functions are known to those skilled and could include FMS initialization, flight plan set-up, thrust settings selection, weight and balance monitoring, flight log tracking, sensor monitoring, FMS database section, and/or default settings review or selection. In the performance of each of these functions, a plurality of pages could be presented in a window on the screen of the display unit.

During aircraft operations on the ground or in flight, a pilot may want to access the same page on more than one occasion through the use of a GUI. This means that the pilot may have to go to the menu and select the desired page, and if the page isn't presented as the front page, he or she may have to drill down one or more pages to access the desired page. Faced with the possibility of performing these tasks, the time a pilot spends interacting with the FMS may be spent inefficiently.

Moreover, there might be an occasion or event at which time the pilot may want to be access the desired page or have such page displayed; however, without an alarm being set or vigilance being taken to monitor the actual occurrence of the occasion or event, such occurrence may pass without pilot awareness.

BRIEF SUMMARY OF THE INVENTION

The embodiments disclosed herein present at least one novel and non-trivial system, device, and method for reducing pilot interaction between pages presented on the screen of a display unit. The use of pin tacks may be used to assist the pilot in his or her interactions with an interactive and graphically-depicted window.

In one embodiment, a system for reducing pilot interaction between pages presented on the screen of a display unit is disclosed. Such system may be comprised of a source of pilot input data, a window generator ("WG"), and a display unit. The WG may be configured to receive the pilot input data and perform a plurality of executions based upon the input data, where the execution being performed may depend on whether such input data is representative of a page GUI or a bookmark GUI.

If the input data is representative of a page GUI being selected by the pilot, a plurality of executions could be performed. If the page GUI is not correlated, the WG could correlate the page GUI with a bookmark. Alternatively, if the page GUI is correlated with a bookmark, the WG could remove a correlation. Additionally, if an alarm limit has been set by the pilot through the page GUI and the alarm limit has been reached, the WG could alter the visual appearance of a correlated bookmark, retrieve the page of the correlated bookmark, and/or sound an alarm.

If the input data is representative of a bookmark GUI being selected by the pilot, a plurality of executions could be performed. If the bookmark GUI is not correlated, the WG could correlate a window bookmark represented in the bookmark GUI with the front page. Alternatively, if the bookmark GUI is representative of a correlated window bookmark not correlated with the front page, the WG could retrieve a bookmarked page correlated with such correlated window bookmark and presenting the retrieved bookmarked page as the front page. Alternatively, if the bookmark GUI is representative of a correlated window bookmark correlated with a page GUI and if the front page is not the page in which such page GUI is integrated, the WG could retrieve the page in which such page GUI is integrated and present the retrieved page as the front page. Alternatively, if the bookmark GUI is representative of a correlated window bookmark correlated with the front page, the WG could remove the correlation.

Then, the WG could generate window image data, where such data may be representative of at least one menu, a front page integrated with at least one page GUI, and at least one bookmark GUI. The number of bookmark GUIs may be dependent upon the window configuration, where each bookmark GUI may be representative of a correlated window bookmark if the window is configured to display correlated window bookmarks only, or the visual appearance of the each window bookmark may be based upon the designation of such bookmark as correlated or uncorrelated if the window is configured to display both correlated window bookmarks and uncorrelated window bookmarks. Then, the window image data may be provided to the display unit, whereby a window is presented to the pilot an the screen of such display unit, where such window is comprised of at least one menu, the front page integrated with at least one page GUI, and at least one bookmark GUI representative of a bookmark.

In another embodiment, a device for reducing pilot interaction between pages presented on the screen of a display unit is disclosed. Such device may be comprised of an input communications interface, a WG, and an output communications interface. After receiving pilot input data through the input communications interface, the WG may be configured to perform a plurality of executions as discussed above, where the execution to be performed may depend on whether such data is representative of a page GUI or a bookmark GUI. After the performance of the application executions, the WG could generate window image data as discussed above, and provide such window image data to the output communications interface for subsequent presentation to the pilot.

In another embodiment, a method for reducing pilot interaction between pages presented on the screen of a display unit is disclosed. After receiving pilot input data and as discussed above, the WG may be configured to perform a plurality of executions, generate window image data, and provide such window to a display unit for subsequent presentation to the pilot.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
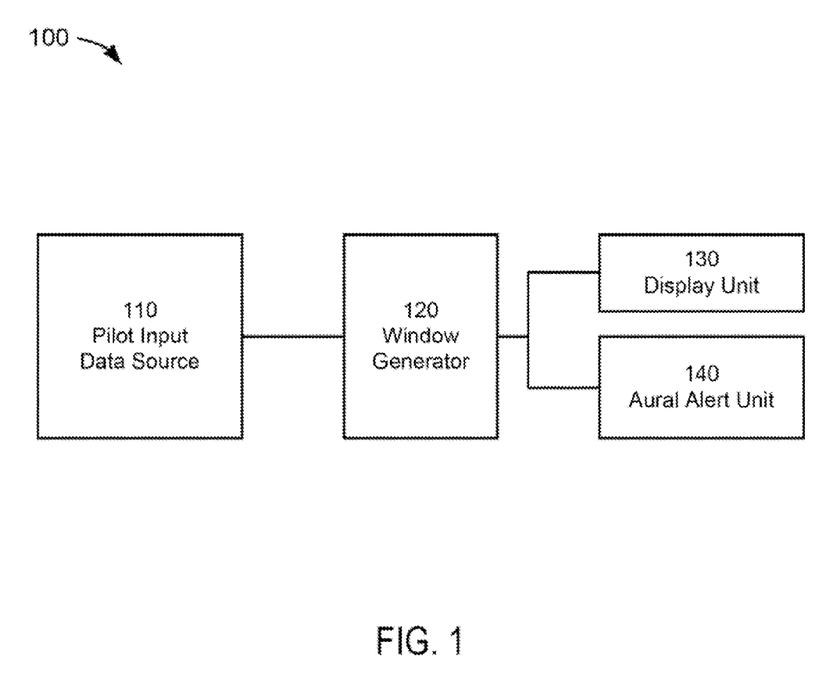
FIG. 1 depicts a block diagram of an interaction reduction system.

FIG. 1 depicts a block diagram of an interaction reduction system 100 suitable for implementation of the techniques described herein. The interaction reduction system 100 of an embodiment of FIG. 1 includes a pilot input data source 110, a window generator 120, a display unit 130, and an aural alerting unit 140.

In an embodiment of FIG. 1, the pilot input data source 110 could comprise any source for facilitating a pilot's interaction with a flight information and/or management system. The pilot input data source 110 may include any device that allows entry of data manually. Such devices could include, but are not limited to, a tactile device (e.g., keyboard, control display unit, cursor control device, touch screen device, etc. . . . ) and/or speech recognition systems. A manual entry device may be integrated with a flight management system ("FMS").

An FMS may perform a variety of functions performed to help the crew in the management of the flight; these functions are known to those skilled in the art. For the purpose of illustration and not limitation, such functions could include FMS initialization, flight plan set-up, thrust settings selection, weight and balance monitoring, flight log tracking, sensor monitoring, FMS database section, and/or default settings review or selection. In the performance of these functions, a plurality of pages could be presented in a window on the screen of the display unit 130. Pilot interaction with one or more of these pages may enable the pilot to manage the various functions before, after, and throughout the flight. As embodied herein, data representative of a pilot input data could be provided by the pilot input data source 110 to the window generator 120 for subsequent processing as discussed herein.

In an embodiment of FIG. 1, the window generator ("WG") 120 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The WG 120 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, the WG 120 could be a processor(s) used by or in conjunction with any other system of the aircraft including, but not limited to, a processor(s) associated with the pilot input data source 110, the display unit 130, and the aural alert unit 140.

The WG 120 may be programmed or configured to receive as input data representative of information obtained from various systems and/or sources including, but not limited to, the pilot input data source 110. As embodied herein, the terms "programmed" and "configured" are synonymous. The WG 120 may be electronically coupled to systems and/or sources to facilitate the receipt of input data; as embodied herein, operatively coupled may be considered as interchangeable with electronically coupled. The WG 120 may be programmed or configured to execute the methods discussed in detail below. The WG 120 may be programmed or configured to provide output data to various systems and/or units including, but not limited to, the display unit 130 and/or the aural alerting unit 140. The WG 120 may be electronically coupled to systems and/or units to facilitate the providing of output data representative of a procedure. It is not necessary that a direct connection be made; instead, such receipt of input data and the providing of output data could be provided through a data bus or through a wireless network.

In an embodiment of FIG. 1, the display unit 130 comprises any unit which could present to the pilot information from a plurality of sources on a screen comprised of one or more interactive and graphically-depicted windows. From the plurality of sources, information corresponding to, but not limited to, flight planning, aircraft performance monitoring, aircraft system monitoring, hazard avoidance, aircraft maintenance, aircraft database management, flight manuals, flight charts and/or and surface maps could be presented on the display unit 130. At least one of the windows presented on the screen may be comprised of a menu from which a pilot may access one or more pages from a plurality of pages stored by one or more aircraft systems, and each page may be comprised of at least on graphical user interface ("GUI"). As embodied herein, data representative of window image data could be provided by the WG 120 to the display unit 130 subsequent visual presentation to the pilot.

In an embodiment of FIG. 1, the aural alerting unit 140 may be any unit capable of producing aural alerts. Aural alerts may be discrete sounds, tones, and/or verbal statements used to annunciate a condition, situation, or event that may require the presentation of an alert to the pilot, where such alert was previously set by the pilot. As embodied herein, an aural alert may be triggered when a pilot-defined alert level has been reached. In addition to a visual indication, the aural alert such as a tonal indicator could accompany the visual indication to draw the attention of the pilot to the reaching of such event. Alternatively, an aural alert could call out "PILOT-DEFINED LEVEL REACHED" when the alert level has been reached. As embodied herein, data representative of aural alert data could be generated and provided by the WG 120 to the aural alert unit 140 for subsequent aural presentation to the pilot The drawings of FIG. 2 provide exemplary depictions of two pages appearing in the same window, each page corresponding to a menu selection made by the pilot. Although the discussion herein will be drawn to pages displayed in response to menu selections corresponding to fuel management and route information, the embodiments are not limited to the display unit 130 presenting these windows only. Although only two pages will be discussed, those skilled in the art understand that a manufacturer or end-user may configure the display unit 130 for the simultaneous presentation of multi-windows on the screen of the display unit 130. Thus, the embodiments disclosed herein are not limited to the examples that will be discussed but apply to the presentation of any window on the screen of the display unit 130 that may be configured to display one or more menus, where each menu item is comprised of one or more pages comprised of GUI(s).

As shown in the drawings of FIG. 2, a window is depicted, where each window has been configured to present information representative of data generated by a flight management system FMS1. In the embodiments of FIGS. 2A through 2D, inclusive, and FIG. 2J, the information presented is illustrative of a response to a pilot's selection of FUEL MGMT from a menu. In the embodiments of FIGS. 2E through 2I, inclusive, the information presented is illustrative of a response to a pilot's selection of ROUTE from a menu.

Figure 2A:
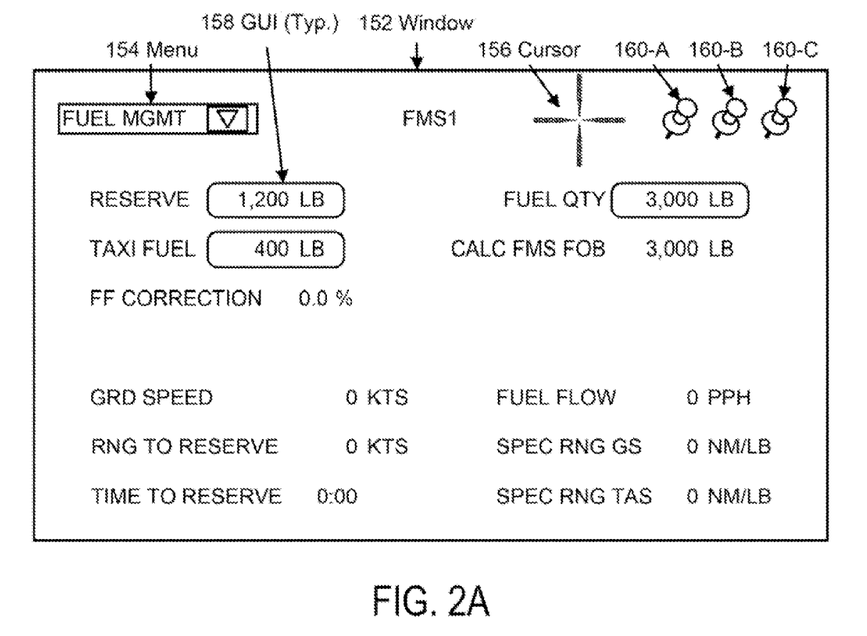
FIG. 2A illustrates a cursor and a window depicting comprised of a menu, a cursor, a plurality of page GUIs, and a plurality of window GUIs.

As illustrated in FIG. 2A, a window 152 depicting information provided by the FMS1 system is comprised of a menu 154, a cursor 156, a plurality of page GUIs 158 representative of GUIs integrated into the front page, and a plurality of bookmark GUIs 160 representative of bookmarks. As embodied herein, there is an inherent correlation between a page GUI and the page into which it is integrated. As shown, an icon of a push pin corresponds to each bookmark GUI 160. The visual appearance of the bookmark GUIs 160 are illustrative of uncorrelated bookmarks that have not been assigned by the pilot as will be discussed below.

Although the push pin will be used herein to represent each bookmark GUI (or the second GUI as discussed below), the disclosures herein are not limited to such icon but may include any icon of which a manufacture and/or end-user decides may be suitable for the purpose. It should be noted that, although these item numbers will not be indicated in the remaining drawings of FIG. 2, they will be used and referred to in the remaining discussion including the plurality of page GUIs 158 (although they will not be shown with a border).

Figure 2B:
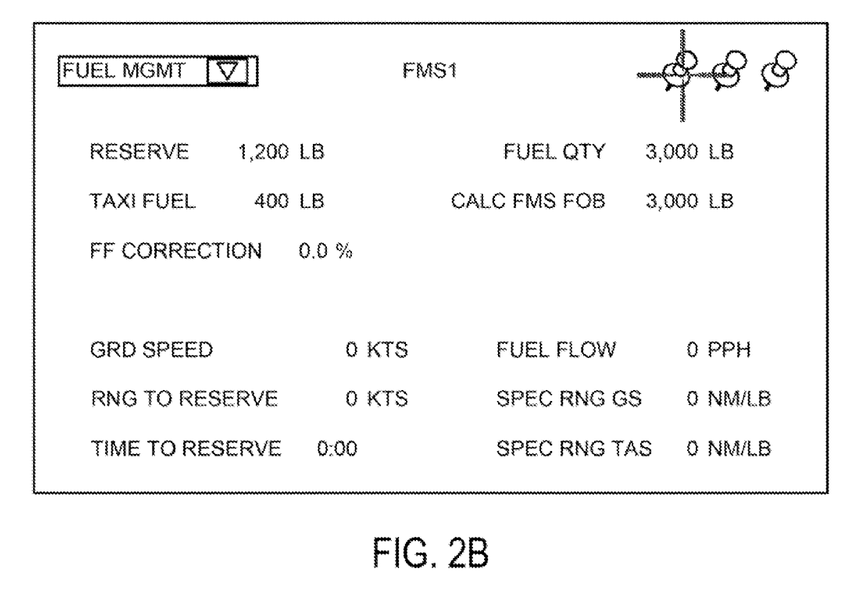
FIGS. 2B and 2C illustrate the visual appearance of window GUIs prior to and after the pilot's selection of one window GUI.
Figure 2C:
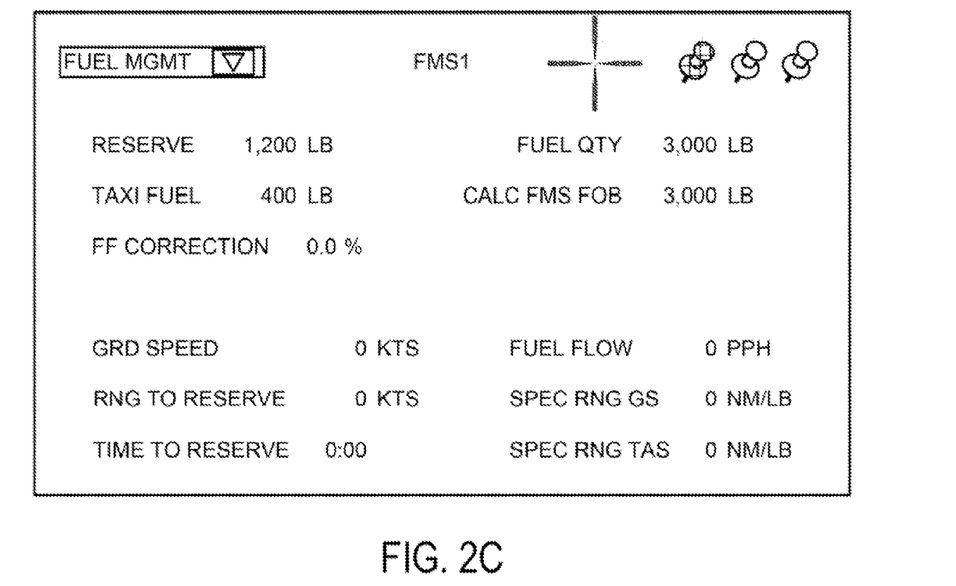

As depicted in FIG. 2B, the pilot may point to or place the cursor over one of the bookmark GUIs and cause it to be selected. Upon selection, the WG 120 may establish a correlation between the front page and the bookmark. Because the bookmark GUI has become a correlated GUI, the visual appearance of the selected bookmark GUI may change to indicate the correlation. As shown in FIG. 2C, the push pin is illustrated with a cross-hatch fill to indicate the change in visual appearance of the bookmark. The differences in appearances provide the pilot with the knowledge that the bookmark has been assigned by him or her. It should be noted that, although the icon remains a push pin, the change in visual appearance could also include a change in the icon.

Figure 2D:
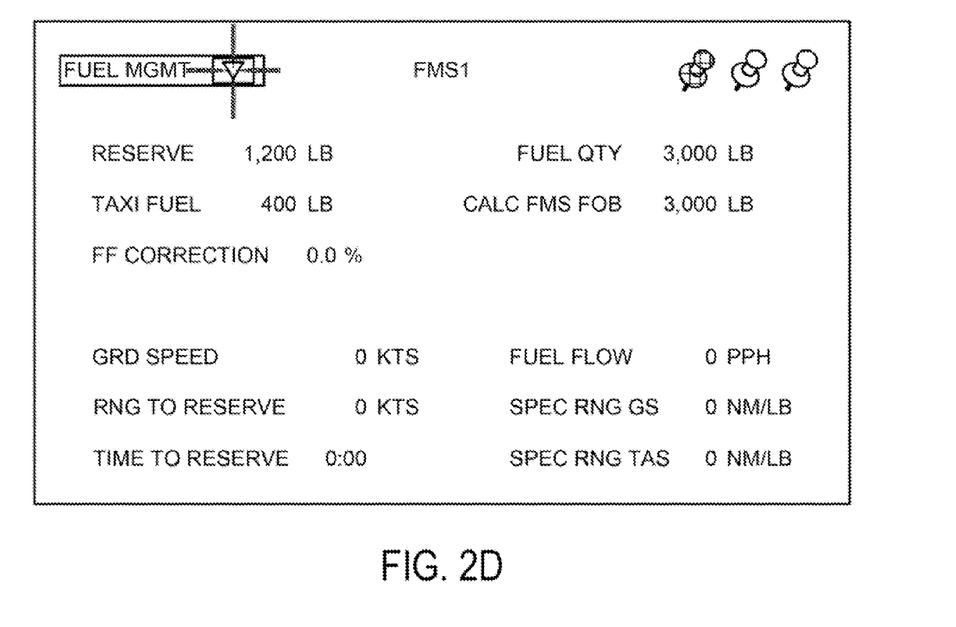
FIG. 2D illustrates the pilot's selection of a second page in a window.

As depicted in FIG. 2D, the pilot may point to or place the cursor over the menu. This could cause a drop down menu to appear from which the pilot may select other pages representative of FMS1 data, where such pages are known to those skilled in the art and are configurable by a manufacturer and/or end-user. For the purpose of illustration and not limitation, such pages could correspond to FMS initialization, flight plan set-up, thrust settings selection, weight and balance monitoring, flight log tracking, sensor monitoring, FMS database section, and/or default settings review or selection.

Figure 2E:
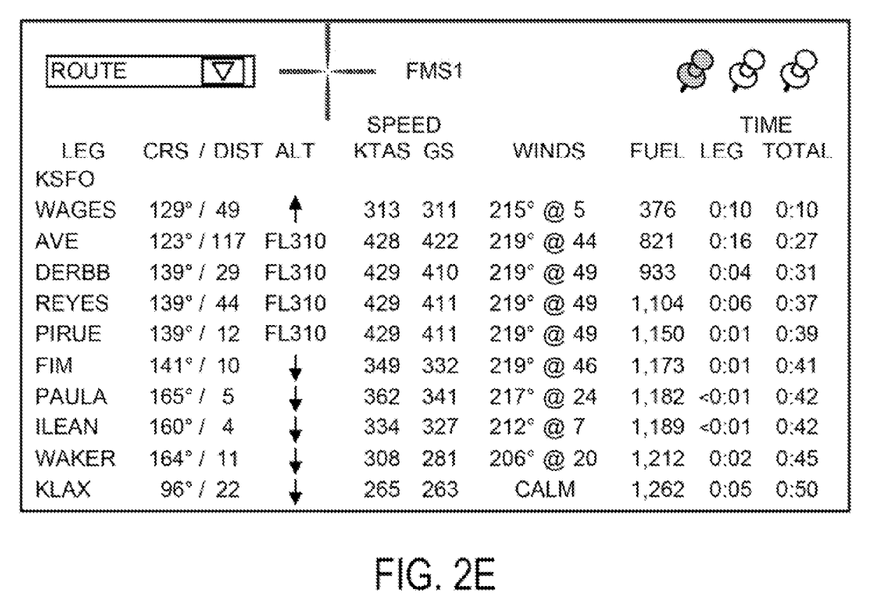
FIGS. 2E through 2H illustrate the visual appearance of the window GUIs prior to and after the pilot's setting of an alert level and selection of a page GUI.

As shown in FIG. 2E, the front page depicts a page corresponding to the pilot's selection of the ROUTE menu. For the purpose of this example, the route is indicative of an assumed flight between San Francisco International Airport (KSFO) and Los Angeles International Airport (KLAX). Because the front page has changed, the visual appearance of the bookmark assigned to the previous front page could change. As shown in FIG. 2E, the push pin that was illustrated with a cross-hatch fill is now shaded to provide the pilot with the knowledge that this bookmark GUI is no longer correlated with the front page but correlated to a previously-displayed page, i.e., the fuel management page.

Figure 2F:
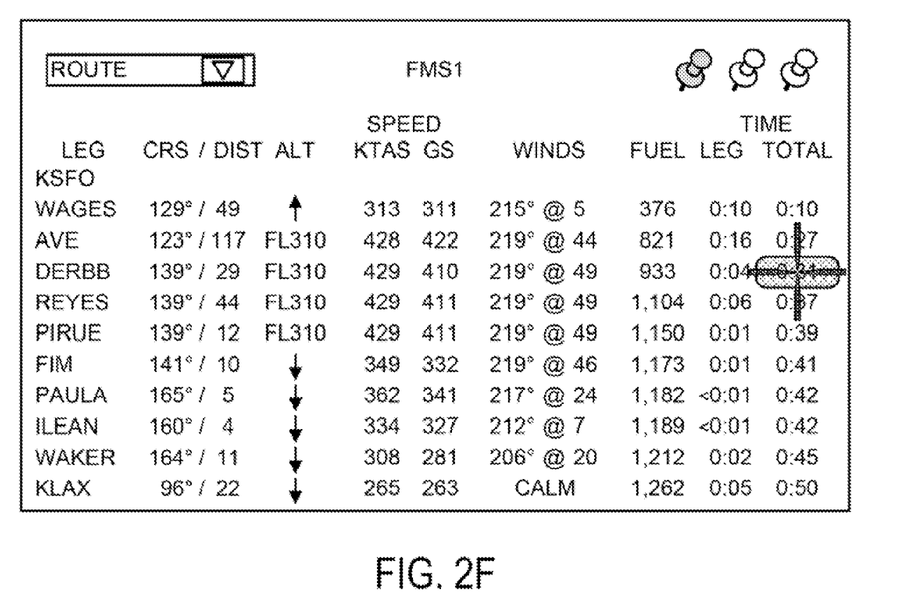
Figure 2G:
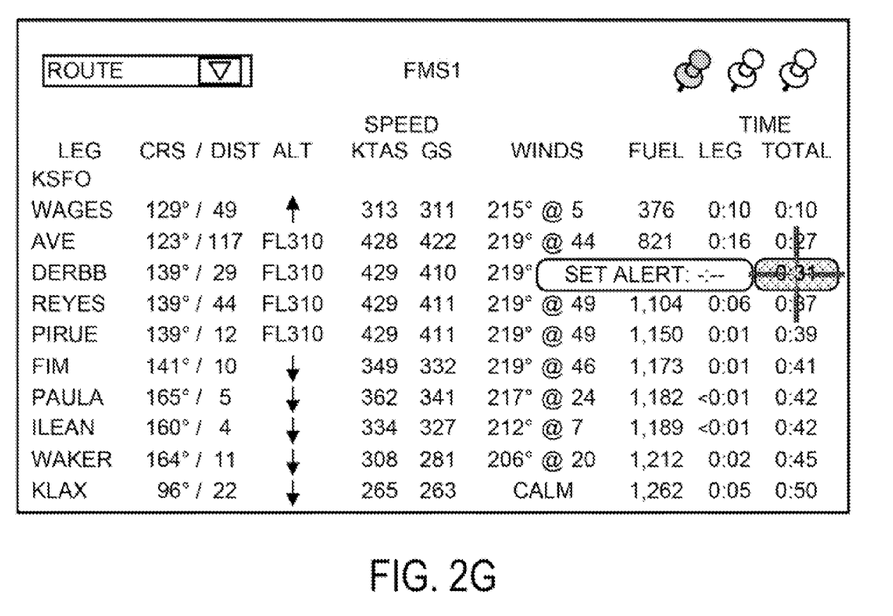
Figure 2H:
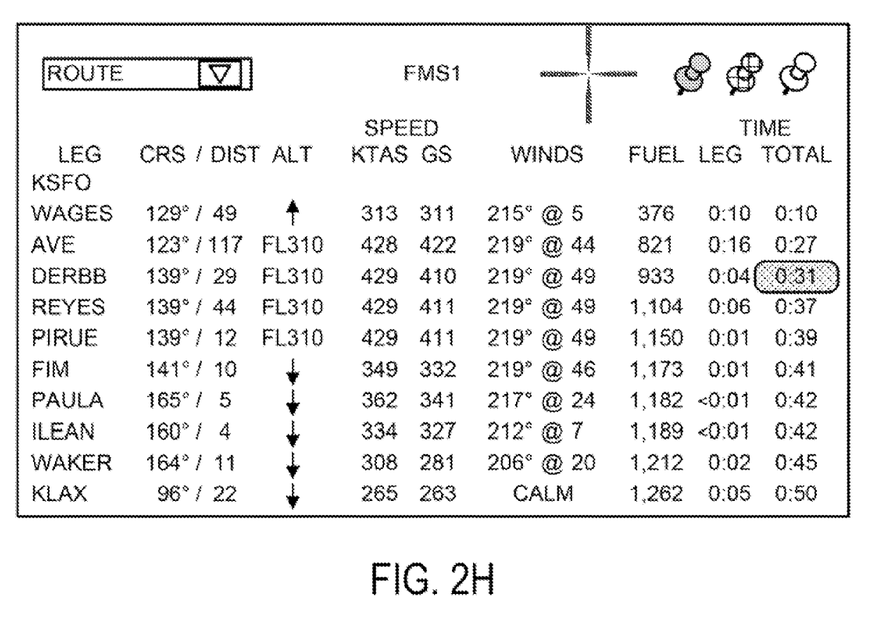

As depicted in FIG. 2F, the pilot may point to or place the cursor over one of the page GUIs and cause it to be selected. Upon selection, an embedded menu and/or an embedded interface menu may appear from which the pilot may set an alert level as depicted in FIG. 2G. From this embedded menu, the pilot could set an alert level that, upon reaching such alert level, the pilot could be alerted. Upon selection of the alert setting, the WG 120 may establish a correlation between the page GUI and the bookmark. As shown in FIG. 2H, a second push pin is filled with a cross-hatch pattern to indicate the change in visual appearance of the now-correlated bookmark. In addition, the visual appearance of the page GUI has been changed to highlight the page GUI for which the alert has been set; when the alert limit is reached thereafter, the page GUI will be highlighted on the page as a reminder to the pilot. If or when the alert level is reached, the WG 120 could cause this correlated bookmark to alter its visual appearance along with an aural alert, if applicable, to draw attention to the pilot that this bookmark requires attention. The pilot may then select this bookmark correlated with an alert page GUI to then have this page re-appear as the front page.

Figure 2I:
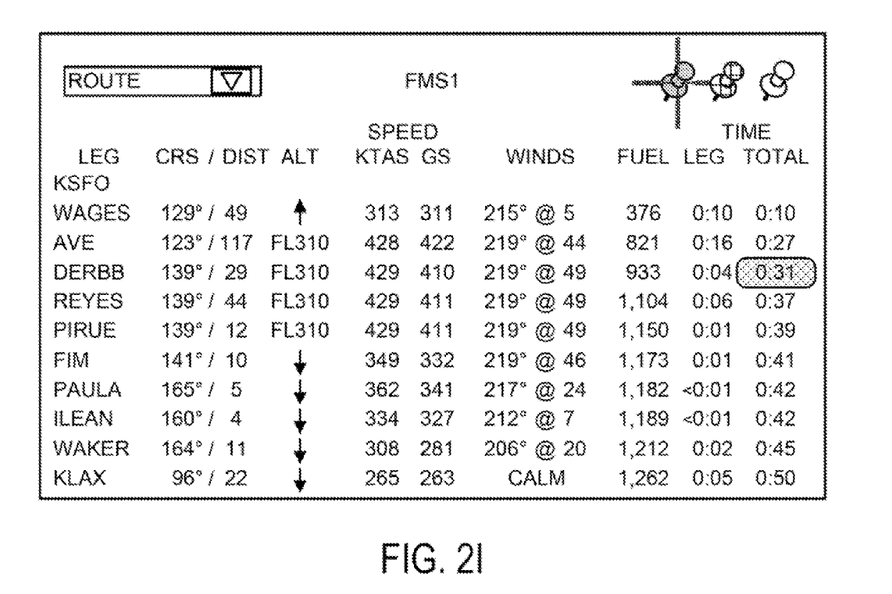
FIGS. 2I and 2J illustrate the use of the window GUI to return to the bookmarked page.
Figure 2J:
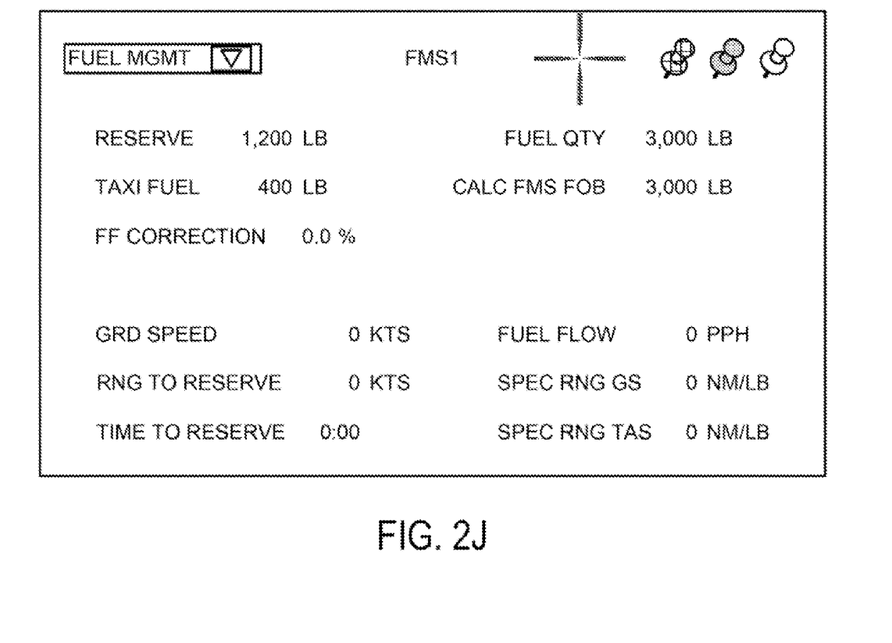

As depicted in FIG. 2I, the pilot may point to or place the cursor over the previously-correlated bookmark GUI and cause it to be selected. Upon selection, the WG 120 may retrieve the page correlated with the bookmark as shown in FIG. 2J. Because the front page has changed, the visual appearance of the bookmark assigned to the previous front page could change. The second push pin that was illustrated with a cross-hatch fill pattern is now shaded in FIG. 2J to indicate the change in visual appearance of the bookmark and to provide the pilot with the knowledge that this bookmark GUI is no longer correlated with the front page; similarly, the first push pin is illustrated with a cross-hatch fill to indicate the change in visual appearance of the bookmark and to provide the pilot with the knowledge that this bookmark GUI is now correlated with the front page. By providing the pilot with the ability of defining bookmarks and correlating such bookmarks to pages or page GUIs integrated into pages, pilot interaction between pages on the screen of the display unit 130 is reduced.

It should be noted that the window in the drawings of FIG. 2 has been configured with a plurality of bookmark GUIs that are either correlated or uncorrelated, where the visual appearance of each bookmark GUI has been dependent on whether such bookmark has been correlated or not; however, a manufacturer and/or end-user may configure the window to display correlated bookmarks only. For example, the selection of a page GUI and/or an alert level could cause not only a correlation to be established between the page GUI and a bookmark but also the appearance of a bookmark in the window that is correlated to the page GUI.

Figure 3:
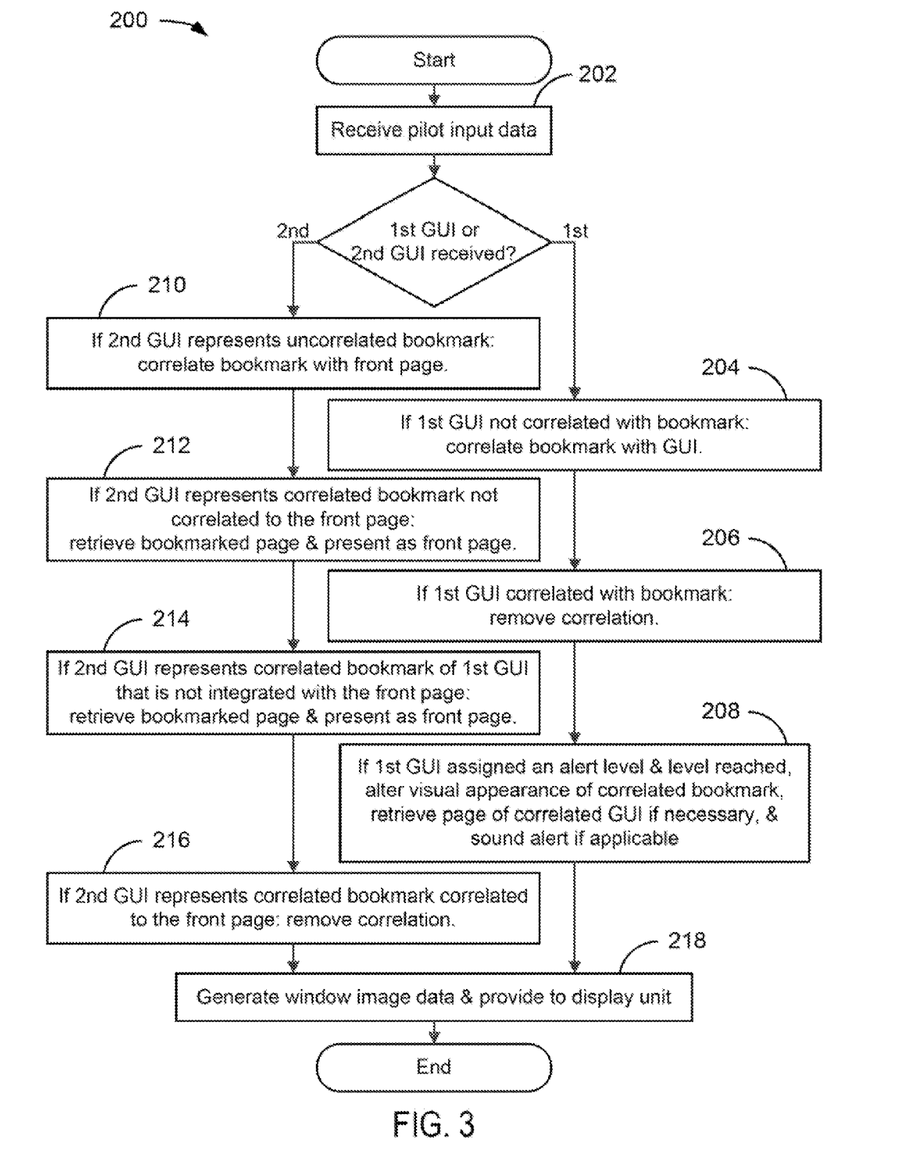
FIG. 3 depicts a flowchart of a method for reducing pilot interaction between pages presented on the screen of a display unit.

FIG. 3 depicts a flowchart 200 of an example of a method for reducing pilot interaction between pages presented on a display unit, where the WG 120 may be programmed or configured with instructions corresponding to the following modules. As embodied herein, the WG 120 may be a processor of an indicating system comprising one or more display units. Also, the WG 120 may be a processor of a module such as, but not limited to, a printed circuit card having one or more input interfaces to facilitate data communications with the WG 120, i.e., the receiving and providing of data. As necessary for the accomplishment of the following modules embodied in FIG. 3, the receiving of data is synonymous and/or interchangeable with the retrieval of data, and the providing of data is synonymous and/or interchangeable with the making available or supplying of data.

The method begins with module 202 with the receiving of pilot input data responsive to a pilot's selection of either the first GUI or the second GUI. As embodied herein, the first GUI could be a page GUI integrated into the front page from which the pilot may choose to bookmark the page. The second GUI could a bookmark GUI representative of a bookmark that is either correlated or uncorrelated.

The flowchart continues with module 204 with the executing of an action. The first GUI could have been previously correlated with a window bookmark. If not, a window bookmark could be correlated with the first GUI. This permits the pilot to assign the first GUI as a bookmark to the front page.

The flowchart continues with module 206 with the executing of an action. If the first GUI has been previously correlated with a window bookmark, then such correlated window bookmark could be uncorrelated; that is, the correlation could be removed. This permits the pilot to use the first GUI for removing the bookmark that he or she had assigned to the front page.

The flowchart continues with module 208 with the executing of an action. The first GUI could be embedded with a menu from which the pilot may set an alert level. If so, the pilot input data could include data representative of such alert level information.

The flowchart continues with module 210 with the executing of an action. The second GUI could have been previously correlated as a window bookmark. If not, a window bookmark could be correlated with the front page and designated as a correlated window bookmark. This permits the pilot to assign the second GUI as a bookmark to the front page.

The flowchart continues with module 212 with the executing of an action. The second GUI could have been previously correlated as a window bookmark. If such correlation to a bookmark has been made and if such correlated window bookmark was not correlated to the front page, then the page corresponding to such correlated bookmark, i.e., bookmarked page, could be retrieved and presented as the front page. This permits the pilot use the second GUI for retrieving a page which was previously bookmarked.

The flowchart continues with module 214 with the executing of an action. The second GUI could have been previously correlated as a window bookmark correlated to a first GUI. If such correlation to the window bookmark has been made and if the front page is not the page in which a first GUI is integrated, then the page in which a first GUI is integrated could be retrieved and presented as the front page. This permits the pilot use the second GUI for retrieving a page which was previously bookmarked with a first GUI.

The flowchart continues with module 216 with the executing of an action. The second GUI could have been previously correlated as a window bookmark. If such correlation to a bookmark has been made and if such correlated window bookmark was correlated to the front page, then such correlated window bookmark could be uncorrelated; that is, the correlation could be removed. This permits the pilot to use the second GUI for removing the bookmark that he or she had assigned to the front page.

The flowchart continues with module 218 with the generating of window image data representative of a window. Such window could be comprised of at least one menu, the front page comprised of at least one first GUI, and at least one second GUI. As embodied herein, the window could be configured to display correlated window bookmark(s) only. If the window is configured to display a plurality of window bookmarks that could be either correlated or uncorrelated, then the visual appearance of each window bookmark may depend on whether it has been correlated or uncorrelated. For example, one color could be used for a correlated window bookmark, and another color could be used for an uncorrelated window bookmark. Additionally, the visual appearance could also be based upon whether the correlated bookmark has a correlation to the front page.

After the window image data has been generated, it may be provided to a display unit. After receiving the window image data, the display could display the window represented such image data, thereby presenting to the pilot a window comprised of at least one menu, the front page integrated with at least one first GUI, and at least one second GUI representative of one bookmark.

In an additional embodiment, if an alert level has been set by the pilot using a first GUI as discussed in module 208, the alert level may be monitored. If it is reached, the visual appearance of the correlated window bookmark may be altered, where such correlated window bookmark was previously correlated with the first GUI. For example, the bookmark could be configured to flash intermittently if the alert level is reached. Additionally, if front page is not the page in which the first GUI is integrated, the page in which such first GUI is integrated may be retrieved and presented as the front page.

In an additional embodiment in which an aural alert unit is present, then aural alert data may be generated and provided to the aural alert unit 140, whereby an aural alert is presented to the pilot when the alert level has been reached. Then, the flowchart proceeds to the end It should be noted that the method steps described above may be embodied in computer-readable media as computer instruction code. It shall be appreciated to those skilled in the art that not all method steps described must be performed, nor must they be performed in the order stated. For example, modules 204 through 216, inclusive, may be executed by the WG 120 separately or in combination with one another. For the purpose of illustration and not of limitation, module 204 may performed as a first execution and module 210 may be performed as a second execution in between the performances of module 202 and module 218. Modules 212, 214, 216 and 206 could be added as third, fourth, fifth, and sixth executions, respectively, to be executed separately or in combination with one another. In addition, module 208 could be split into three separate executions, i.e., seventh, eight, and ninth executions.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for reducing pilot interaction between pages presented on the screen of an aircraft display unit, such system comprising:
   a source of pilot input data;
   an aircraft display unit; and
   an electronic processing unit configured to
      present first window image data representative of a window comprised of a plurality of only immobile images on the aircraft display unit, where
         the placement of the plurality of immobile images within the window is fixed,
         a first immobile image is comprised of at least one expandable menu, where
            one expandable menu is a menu from which a flight management system page is selectable and presentable as a front page,
         a second immobile image is comprised of the front page that is integrated with at least one page graphical user interface ("GUI"), and
         a third immobile image is comprised of at least one bookmark GUI representative of one correlatable window bookmark, where
            each page GUI is a GUI integrated into the front page presenting information sourced by an aircraft system, and
            the number of bookmark GUIs is dependent upon the configuration of the window, where
               each bookmark GUI is representative of a correlated window bookmark only, or
               a visual appearance of the each window bookmark is based upon whether such bookmark is correlated or uncorrelated,
      receive pilot input data responsive to a pilot's selection of either a page GUI or a bookmark GUI, where
         the pilot input data includes data representative of page GUI alert level set by the pilot if a selected page GUI is embedded with an interface menu from which the alert level is set by the pilot,
      execute a first action if the pilot has selected a page GUI that is not correlated with a window bookmark, where
         such the first action creates a correlation between the page GUI and a window bookmark and alters the visual appearance of the third immobile image,
      execute a second action if the pilot has selected a bookmark GUI that is representative of an uncorrelated bookmark, where
         such second action creates a correlation between the front page and a window bookmark and alters the visual appearance of only the third immobile image,
      execute a third action if a page GUI alert level set by the pilot is reached, where
         such third action alters the visual appearance of only the second immobile image,
      generate second window image data representative of a change to the first window image data made in response to
         a pilot selection of a page GUI,
         a pilot selection of a bookmark GUI, or
         a pilot-set, page GUI alert level is reached, and
      provide the second window image data to the aircraft display unit, whereby the plurality of immobile images are presented to the pilot.

2. The system of claim 1, wherein the electronic processing unit is further configured to
   execute a fourth action if the pilot has selected a bookmark GUI that is representative of a correlated window bookmark not correlated with the front page, where
      such fourth action is comprised of
         retrieving a bookmarked page correlated with such correlated window bookmark, and
         presenting the retrieved bookmarked page as the front page,
   execute a fifth action if the pilot has selected a bookmark GUI that is representative of a correlated window bookmark correlated with a page GUI and if the front page is not the page in which such page GUI is integrated, where
      such fifth action is comprised of
         retrieving the page in which such page GUI is integrated, and
         presenting the retrieved page as the front page, and
   execute a sixth action if the pilot has selected a bookmark GUI that is representative of a correlated window bookmark correlated with the front page, where
      such sixth action is comprised of removing such correlation.

3. The system of claim 1, wherein
   the electronic processing unit is further configured to
      execute a seventh action if the pilot has selected a page GUI that is correlated with a window bookmark, where
         such seventh action is comprised of removing such correlation.

4. The system of claim 1, wherein a push pin corresponds to at least one bookmark GUI.

5. The system of claim 1, wherein
   the electronic processing unit is further configured to
      execute an eighth action if the alert level for the page GUI has been reached and if the front page is not the page in which such page GUI is integrated, where
         such eighth action is comprised of
            retrieving the page in which such page GUI is integrated, and
            presenting such retrieved page as the front page.

6. The system of claim 1, further comprising:
   an aural alert unit configured to receive aural alert data, where
      the electronic processing unit is further configured to
         execute a ninth action if the alert level for the page GUI has been reached, where
            such ninth action is comprised of
               generating aural alert data, and
               providing the aural alert data to the aural alert unit, whereby an aural alert is presented to the pilot.

7. A device for reducing pilot interaction between pages presented on the screen of an aircraft display unit, such device comprising:
   an electronic processing unit configured to
      present first window image data representative of a window comprised of a plurality of only immobile images on the aircraft display unit, where
         the placement of the plurality of immobile images within the window is fixed,
         a first immobile image is comprised of at least one expandable menu, where
            one expandable menu is a menu from which a flight management system page is selectable and presentable as a front page, a second immobile image is comprised of the front page that is integrated with at least one page graphical user interface ("GUI"), and a third immobile image is comprised of at least one bookmark GUI representative of one correlatable window, where each page GUI is a GUI integrated into the front page presenting information sourced by an aircraft system, and the number of bookmark GUIs is dependent upon the configuration of the window, where each bookmark GUI is representative of a correlated window bookmark only, or a visual appearance of the each window bookmark is based upon whether such bookmark is correlated or uncorrelated;

receive pilot input data responsive to a pilot's selection of either a page GUI or a bookmark GUI, where the pilot input data includes data representative of page GUI alert level set by the pilot if a selected page GUI is embedded with an interface menu from which the alert level is set by the pilot;

execute a first action if the pilot has selected a page GUI that is not correlated with a window bookmark, where such second action creates a correlation between the front page and a window bookmark and alters the visual appearance of only the third immobile image;

execute a second action if the pilot has selected a bookmark GUI that is representative of an uncorrelated bookmark, where such second action creates a correlation between the front page and a window bookmark and alters the visual appearance of the third immobile image only;

execute a third action if a page GUI alert level set by the pilot is reached, where such third action alters the visual appearance of only the second immobile image;

generate second window image data representative of a change to the first window image data made in response to a pilot selection of a page GUI,
a pilot selection of a bookmark GUI, or
a pilot-set, page GUI alert level is reached; and provide the second window image data to an output communications interface to facilitate the providing of the second window image data to the aircraft display unit, whereby the plurality of immobile images are presented to the pilot.

8. The device of claim 7, wherein
the electronic processing unit is further configured to
execute a fourth action if the pilot has selected a bookmark GUI that is representative of a correlated window bookmark not correlated with the front page, where such fourth action is comprised of
retrieving a bookmarked page correlated with such correlated window bookmark, and
presenting the retrieved bookmarked page as the front page;

execute a fifth action if the pilot has selected a bookmark GUI that is representative of a correlated window bookmark correlated with a page GUI and if the front page is not the page in which such first GUI is integrated, where such fifth action is comprised of
retrieving the page in which such page GUI is integrated, and
presenting the retrieved page as the front page; and execute a sixth action if the pilot has selected a bookmark GUI that is representative of a correlated window bookmark correlated with the front page, where such sixth action is comprised of removing such correlation.

9. The device of claim 7, wherein
the electronic processing unit is further configured to
execute a seventh action if the pilot has selected a page GUI that is correlated with a window bookmark, where such seventh action is comprised of removing such correlation.

10. The device of claim 7, wherein a push pin corresponds to at least one bookmark GUI.

11. The device of claim 7, wherein
the electronic processing unit is further configured to
execute an eighth action if the alert level for the page GUI has been reached and if the front page is not the page in which such page GUI is integrated, where such eighth action is comprised of
retrieving the page in which such page GUI is integrated, and
presenting such retrieved page as the front page.

12. The device of claim 7, wherein
the electronic processing unit is further configured to
execute a ninth action if the alert level for the page GUI has been reached, where such ninth action is comprised of
generating aural alert data, and
providing the aural alert data to the aural alert unit, whereby an aural alert is presented to the pilot.

13. A method for reducing pilot interaction between pages presented on the screen of an aircraft display unit, such method comprising:

presenting first window image data representative of a window comprised of a plurality of only immobile images on the aircraft display unit, where the placement of the plurality of immobile images within the window is fixed, a first immobile image is comprised of at least one expandable menu, where one expandable menu is a menu from which a flight management system page is selectable and presentable as a front page, a second immobile image is comprised of the front page that is integrated with at least one page graphical user interface ("GUI"), and a third immobile is comprised of at least one bookmark GUI representative of one correlatable window bookmark, where each page GUI is a GUI integrated into the front page presenting information sourced by an aircraft system, and the number of bookmark GUIs is dependent upon the configuration of the window, where each bookmark GUI is representative of a correlated window bookmark only, or a visual appearance of the each window bookmark is based upon whether such bookmark is correlated or uncorrelated;

receiving pilot input data responsive to a pilot's selection of either a page GUI or a bookmark GUI, where the pilot input data includes data representative of page GUI alert level set by the pilot if a selected page GUI is embedded with an interface menu from which the alert level is set by the pilot;

executing a first action if the pilot has selected a page GUI that is not correlated with a window bookmark, where
such the first action creates a correlation between the page GUI and a window bookmark and alters the visual appearance of the third immobile image;

executing a second action if the pilot has selected a bookmark GUI that is representative of an uncorrelated bookmark, where
such second action creates a correlation between the front page and a window bookmark and alters the visual appearance of only the third immobile image;

executing a third action if a page GUI alert level set by the pilot is reached, where
such third action alters the visual appearance of only the second immobile image;

generate second window image data representative of a change to the first window image data made in response to
a pilot selection of a page GUI,
a pilot selection of a bookmark GUI, or
a pilot-set, page GUI alert level is reached; and providing the second window image data to an output communications interface to facilitate the providing of the second window image data to the aircraft display unit, whereby
the plurality of immobile images are presented to the pilot.

14. The method of claim 13, further comprising:
executing a fourth action if the pilot has selected a bookmark GUI that is representative of a correlated window bookmark not correlated with the front page, where
such fourth action is comprised of
retrieving a bookmarked page correlated with such correlated window bookmark, and
presenting the retrieved bookmarked page as the front page, executing a fifth action if the pilot has selected a bookmark GUI that is representative of a correlated window bookmark correlated with a page GUI and if the front page is not the page in which such first GUI is integrated, where
such fifth action is comprised of
retrieving the page in which such page GUI is integrated, and
presenting the retrieved page as the front page, and executing a sixth action if the pilot has selected a bookmark GUI that is representative of a correlated window bookmark correlated with the front page, where
such sixth action is comprised of removing such correlation.

15. The method of claim 13, further comprising:
executing a seventh action if the pilot has selected a page GUI that is correlated with a window bookmark, where
such seventh action is comprised of removing such correlation.

16. The method of claim 13, wherein a push pin corresponds to at least one bookmark GUI.

17. The method of claim 13, further comprising:
executing an eighth action if the alert level for the page GUI has been reached and if the front page is not the page in which such page GUI is integrated, where
such eighth action is comprised of
retrieving the page in which such page GUI is integrated, and
presenting such retrieved page as the front page.

18. The method of claim 13, further comprising:
executing a ninth action if the alert level for the page GUI has been reached, where
such ninth action is comprised of
generating aural alert data, and
providing the aural alert data to an aural alert unit, whereby an aural alert is presented to the pilot.

* * * * *